M. D. WILLARD.
WASHER.
APPLICATION FILED JAN. 7, 1909.

937,199.

Patented Oct. 19, 1909.

WITNESSES:
W. M. Dollar.
Chas. W. Stauffiger.

INVENTOR
Mathew D. Willard
BY J. W. Ellis
ATTORNEY

UNITED STATES PATENT OFFICE.

MATHEW D. WILLARD, OF BUFFALO, NEW YORK.

WASHER.

937,199.  Specification of Letters Patent.  Patented Oct. 19, 1909.

Application filed January 7, 1909. Serial No. 471,186.

*To all whom it may concern:*

Be it known that I, MATHEW D. WILLARD, a citizen of the United States, and a resident of Buffalo, county of Erie, and State of New York, have invented certain new and useful Improvements in Washers, of which the following is a full, clear, and exact description.

My invention relates to an improved washer which is hereinafter fully described.

The object of my invention has been to produce a washer in the most economical manner involving the least possible waste of material and at the same time producing a washer that will be lighter than those heretofore produced and one that would be stronger and more efficient.

As is well known to those skilled in the art washers of the class herein described have been produced from solid metallic bars or rods. These bars or rods have been initially of the size of the greatest diameter of the washer. The ends of the bars or rods have been first treated with a double cutting tool which simultaneously forms the inner and outer faces of the washer. A cutting tool is then brought at right angles to the bar and a disk having the formed front face already made on it as described, is cut off from the bar. This completes the washer.

The process just described necessitates a great waste of material and moreover is a very expensive and slow process to perform. Moreover the washer thus formed is made of an unnecessary amount of metal which does not add to its strength or its efficiency.

In producing my invention I have sought to make a washer out of less material and at the same time make it stronger and more efficient. Moreover my washer is capable of being produced at a much less expense and much faster than washers manufactured as previously described.

Figure 1:
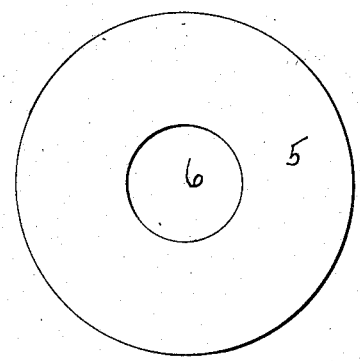
Figure 2:
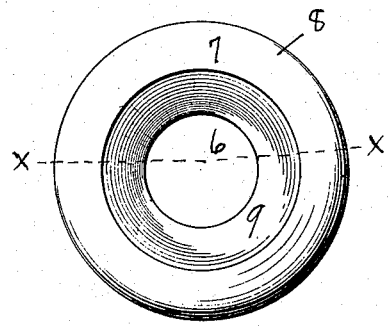
Figure 3:
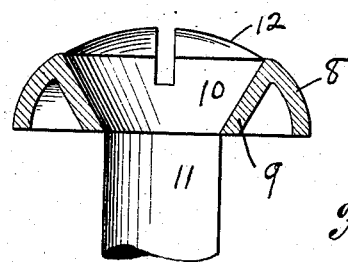

Referring now to the accompanying drawings: Figure 1 represents a metallic blank or disk cut from a sheet of metal of suitable thickness. Fig. 2 represents a top plan view of my washer. Fig. 3 is a cross section of Fig. 2 taken on the line $x$—$x$ and shows a screw head fitted into it.

In producing my invention I first select a metallic sheet of suitable thickness and cut from it a disk or blank 5 of somewhat greater diameter than the diameter of the finished washer and from the center of this blank I cut a circular hole 6 of somewhat less diameter than the hole of the finished washer. The blank 5 is then placed in a forming die adapted to form the finished washer into the desired shape. Thus in producing a washer like the washer 7 shown in Fig. 2, the die is so formed that the outside surface 8 shall be made convex as clearly shown. The inner face 9 of the washer is inwardly tapered and made a true circle by the die former while the pilot of the die passes through the hole 6 of the blank 5 and fixes that hole to the desired size of the finished product. When the finished washer has been produced as described it will be seen that it is adapted to receive a screw head 10 which is in effect countersunk within the concave outer surface of the washer while the periphery of the convex outer surface 8 forms substantially an unbroken line with the outer surface 12 of the screw 10. At the same time the stem 11 of the screw passes through the hole 6 of the washer. It will be observed that the angular relation between the convex outer surface 8 and the tapering concave inner surface 9 of the washer unites to form a very rigid construction and at the same time no unnecessary amount of metal is wasted since the space between the outer and the inner front faces of the washer is hollow.

It will be obvious from the foregoing description that my improved washer is light, strong and efficient, and moreover is cheaply produced without any substantial waste of metal. Comparing the waste of metal made in producing the washers of the prior art described in the introductory paragraphs of my specification with the waste of metal made in producing my washer, it is estimated that in producing the prior art washers out of every ten pounds of washers made there is a waste of fourteen pounds of metal while in making my washers, out of every ten pounds of metal used there is a waste of not more than a pound of metal.

Having thus described my invention, what I claim is:

1. As an article of manufacture a washer formed from a single metal sheet and provided with two outer surfaces, one of said surfaces being convex and the other of said surfaces being inwardly tapered, the inside of said washer being hollow and the bottom of said washer being composed of the flush edges of said outer surfaces.

2. As an article of manufacture a washer composed of a single metal sheet perforated at its center and having its outer surface substantially convex in form, a central inwardly tapered surface and having its base formed by the flush edges of said convex surface and said inwardly tapered surface.

In testimony whereof, I have hereunto set my hand in the presence of two witnesses.

MATHEW D. WILLARD.

Witnesses:
W. M. DOLLAR,
ETHEL A. KELLY.